United States Patent
Winkler et al.

(10) Patent No.: US 10,112,599 B2
(45) Date of Patent: Oct. 30, 2018

(54) DRIVE DEVICE FOR A MOTOR VEHICLE

(71) Applicant: AUDI AG, Ingolstadt (DE)

(72) Inventors: Josef Winkler, Kipfenberg (DE); Karin Vogtherr, Karlshuld (DE); Michael Wansner, Schrobenhausen (DE)

(73) Assignee: AUDI AG, Ingolstadt (DE)

( * ) Notice: Subject to any disclaimer, the term of this patent is extended or adjusted under 35 U.S.C. 154(b) by 92 days.

(21) Appl. No.: 15/516,974

(22) PCT Filed: Oct. 1, 2015

(86) PCT No.: PCT/EP2015/001936
§ 371 (c)(1),
(2) Date: Apr. 5, 2017

(87) PCT Pub. No.: WO2016/055145
PCT Pub. Date: Apr. 14, 2016

(65) Prior Publication Data
US 2017/0253232 A1 Sep. 7, 2017

(30) Foreign Application Priority Data

Oct. 7, 2014 (DE) .................. 10 2014 014 848

(51) Int. Cl.
B60W 20/15 (2016.01)
F16H 61/68 (2006.01)
(Continued)

(52) U.S. Cl.
CPC ............ *B60W 20/15* (2016.01); *B60W 10/06* (2013.01); *B60W 10/08* (2013.01); *B60W 10/11* (2013.01);
(Continued)

(58) Field of Classification Search
None
See application file for complete search history.

(56) References Cited

U.S. PATENT DOCUMENTS 2,551,746 A 5/1951 Iavelli
5,643,133 A 7/1997 Minowa et al.
(Continued)

FOREIGN PATENT DOCUMENTS

CN 101535681 A 9/2009
CN 101688599 A 3/2010
(Continued)

OTHER PUBLICATIONS

German Office Action dated Jan. 19, 2018 of corresponding application No. DE10 2014 014 848.3; 10 pgs.
(Continued)

Primary Examiner — Colby M Hansen
(74) Attorney, Agent, or Firm — Maier & Maier, PLLC

(57) ABSTRACT

A drive device for a motor vehicle, having an internal combustion engine that outputs to a gearbox or transmission. A plurality of gear ratios steps provides shiftable driving gears from a starting gear to a highest driving gear. The gearbox has at least one gear ratio step that provides an overrun gear, which cannot be engaged in the traction mode, but only in an overrun mode, in which the vehicle drags the internal combustion engine.

8 Claims, 3 Drawing Sheets

(51) Int. Cl.
  *B60W 10/06* (2006.01)
  *B60W 10/08* (2006.01)
  *B60W 10/11* (2012.01)
  *F16H 61/02* (2006.01)
  *B60W 30/18* (2012.01)

(52) U.S. Cl.
  CPC .............. *B60W 30/18072* (2013.01); *B60W 30/18127* (2013.01); *F16H 61/0213* (2013.01); *B60W 2030/18081* (2013.01); *B60W 2510/0638* (2013.01); *B60W 2710/065* (2013.01); *B60W 2710/1005* (2013.01); *B60Y 2200/92* (2013.01); *F16H 61/68* (2013.01); *F16H 2061/0237* (2013.01); *Y10S 903/93* (2013.01)

(56) References Cited

U.S. PATENT DOCUMENTS

| | | | | |
|---|---|---|---|---|
| 6,591,705 B1* | 7/2003 | Reik | ............... | B60W 10/02 74/343 |
| 2009/0043467 A1* | 2/2009 | Filev | ............... | B60W 20/15 701/57 |
| 2011/0130901 A1* | 6/2011 | Mori | ............... | B60K 6/445 701/22 |
| 2014/0136040 A1* | 5/2014 | Scholz | ............ | B60W 10/06 701/22 |
| 2014/0142796 A1* | 5/2014 | Zollner | ........... | B60W 10/02 701/22 |

FOREIGN PATENT DOCUMENTS

| | | |
|---|---|---|
| DE | 10018245 A1 | 10/2000 |
| DE | 10209514 A1 | 10/2002 |
| DE | 102007004412 A1 | 7/2008 |
| DE | 102007010295 A1 | 9/2008 |
| DE | 102007044432 A1 | 3/2009 |
| DE | 10 2010 041 324 A1 | 3/2012 |
| DE | 102010062381 A1 | 6/2012 |
| DE | 102013200502 A1 | 8/2013 |

OTHER PUBLICATIONS

Notification of Transmittal of Translation of the International Preliminary Report on Patentability dated Apr. 20, 2017 corresponding PCT/EP2015/001936; 9pgs.

Chinese Office Action dated Apr. 11, 2018, in connection with corresponding CN Application No. 201580066424.0 (5 pgs.).

German Office Action dated Feb. 5, 2015 of corresponding application No. DE10 2014 014 8483; 7 pgs.

International Search Report and Written Opinion dated Dec. 10, 2015 of corresponding application No. PCT/EP2015/001936; 12 pgs.

* cited by examiner

DRIVE DEVICE FOR A MOTOR VEHICLE

FIELD

The invention relates to a drive device for a motor vehicle.

BACKGROUND

Depending on the driving situation, a motor vehicle can be operated in traction mode, in which the motor vehicle is driven by the drive engine (internal combustion engine and/or electric motor), or it can be operated in overrun mode, in which the motor vehicle is driven by the vehicle wheels or coasts.

An overrun cut-off, at which no fuel injection is carried out in order to save fuel, occurs for a vehicle in overrun mode. In such an overrun mode, the vehicle drags the drive train. All dynamic parts of the drive train produce a drag torque, which counteracts the drive torque. The drag torque depends on the rotational speed of the internal combustion engine. That is, the lower the rotational speed of the internal combustion engine, the lower is also the drag torque. Therefore, for reduction of the drag torque in overrun mode, the gearbox control unit shifts the automatic transmission to a high gear, in which the internal combustion engine continues to rotate at reduced rotational speed. A generic drive device with such an overrun upshift is known, for example, from DE 10 2013 200 502 A1 or from DE 10 2010 041 324 A1.

The gear ratio steps that are available to the driving gears are usually dimensioned in such a way that a harmonic and smoothly drivable gear spacing to and gear engagement at the next higher driving gear results. Accordingly, the progressive ratio steps are to be laid out in a progressive ratio step diagram or in a gear spacing diagram. A progressive ratio step is defined as the quotient of the ratio of a driving gear to the ratio of the next-higher driving gear. In common practice, the progressive ratio step is greater the lower the driving gears are, and often gravitates toward the horizontal at high gears. The engine speed differential is therefore greater, the lower the driving gear is.

In the prior art, the ratio of the highest driving gear is also adjusted in an automatic transmission in agreement with the above design practice, with the automatic transmission being engaged as an overrun gear in overrun mode by the gearbox control unit and, namely, in such a way that the progressive ratio step from the second-highest driving gear to the highest driving gear (that is, the overrun gear) is small, so as to ensure a harmonic gear engagement in traction mode. In this case, however, on account of the small progressive ratio step from the second-highest driving gear to the highest driving gear (that is, overrun gear), the drag losses produced in the internal combustion engine continue to remain high.

A further reduction in the drag losses can be achieved by switching off the internal combustion engine in the overrun phases and disengaging the clutch between the internal combustion engine and the gearbox (transmission). In addition, the internal combustion engine must be restarted, as needed, even at higher speeds. This places an enormous load on the electrical system of the vehicle. For reasons of safety, therefore, a redundant power supply (that is, two batteries, which are decoupled from each other) is required. Moreover, during the overrun phase, diverse auxiliary assemblies—that is, the air-conditioning system, the vacuum-assisted braking system, and the like—are deactivated. In addition, if acceleration is to occur once again during the overrun phase, it takes a very long time for the internal combustion engine to connect to the gearbox once again in a force-locking manner.

In hybrid-driven motor vehicles having an internal combustion engine and a driving electric motor as second drive source, it is advantageous, for supplying the electrical system of the vehicle or for achieving an efficient recuperation operation, to engage the overrun mode and, if need be, a braking operation of the motor vehicle with as small a braking effect as possible by way of the internal combustion engine via the electric motor switched to operation as a generator. For this purpose, it is also appropriate in the case of a coupled internal combustion engine to shift the transmission into a higher driving gear.

SUMMARY OF THE DISCLOSURE

The object of the invention is to make available a drive device for which an overrun mode can be obtained that is improved in efficiency and/or braking operation of the motor vehicle in terms of fuel consumption and/or in terms of recuperation operation.

In accordance with an exemplary embodiment, the transmission has at least one ratio step that provides an overrun gear, which is not activated by the gearbox control unit in traction mode, but rather only in overrun mode, in which the vehicle drags the internal combustion engine with build-up of a drag torque that reduces the drive torque. Accordingly, because the overrun gear can then be utilized only for the overrun mode and not for the traction mode, a harmonic engagement of the overrun gear with the next-lowest—gear in contrast to the above prior art □ plays no role. Accordingly, in designing the ratio of the overrun gear, the focus can be directed specifically at a very strong reduction of the rotational speed of the internal combustion engine down to the idling rotational speed or below.

The overrun gear can be engaged in overrun mode of the motor vehicle and at higher speed, with it being possible to lower the rotational speed of the internal combustion engine to the idling rotational speed or below. Therefore, it is possible by way of the proposal in accordance with the invention to increase the utilization of the kinetic energy of the motor vehicle, even in a higher speed range, but without decoupling or switching off the internal combustion engine and without losing propulsion. In this case, the overrun gear ratio step substantially lowers the rotational speed of the internal combustion engine; in addition, at lower vehicle speeds, this can be brought about by the overrun upshifts, which are known as such, via the driving gears.

As viewed especially preferably in a progressive ratio step diagram of the gearbox with linear or decreasing progressive ratio steps, the overrun gear can be designed on a largest progressive ratio step in order to ensure an effective lowering of the rotational speed. In this case, it is to be taken into consideration that the overrun gear does not have to form a harmonic ratio with the neighboring, highest driving gear, because it is only engaged in overrun mode at higher speed of travel and is preferably automated.

In an advantageous enhancement of the invention, it is possible to provide at least two overrun gears that cannot be used as driving gears and are engaged depending on the speed, in such a way that the rotational speed of the internal combustion engine in overrun mode can be kept essentially at idling rotational speed over a wide range of speeds. Accordingly, the useful effect is further enhanced.

In the case of a hybrid-driven motor vehicle with an internal combustion engine and a transmission, the at least one overrun gear is engaged when, at an appropriate speed, the motor vehicle is braked via the electric motor in recuperation operation.

Furthermore, in recuperation operation of the electric motor or in braking operation of the motor vehicle in at least two overrun gears that are not provided as driving gears, these overrun gears can be engaged in such a way that the rotational speed of the internal combustion engine is kept in the idling speed range over an even larger range of speeds or the braking effect is brought about nearly only by the electric motor with corresponding recovery of energy.

An especially preferred device for carrying out the method for a motor vehicle, in particular a hybrid-driven motor vehicle, having an internal combustion engine, a gearbox or transmission with a plurality of gear ratios, and, if appropriate, an electric motor as second drive source, consists in the fact that the gearbox is provided with at least one gear ratio step that cannot be used as a driving gear or has an overrun gear that, in overrun mode of the motor vehicle, can be engaged and, in the range of higher speeds of the motor vehicle, lowers the rotational speed of the internal combustion engine essentially to idling rotational speed.

Furthermore, an electronic control unit can disable the supply of fuel to the internal combustion engine in overrun mode and, if appropriate in braking operation of the motor vehicle and the at least one overrun gear can be engaged in the higher range of speeds of the motor vehicle.

Finally, for at least two overrun gears of the gearbox that cannot be used as driving gears, the transmission gear ratios are engaged in such way that the rotational speed of the internal combustion engine is kept above the injection threshold for the fuel and/or that the injection threshold, which is dependent on the rotational speed, is reduced via the control unit. This has the advantage that the supply of fuel can be stopped to a very large extent and nonetheless a dynamically favorable shift from overrun mode of the motor vehicle to drive mode is ensured exclusively by the internal combustion engine or in combination with the electric motor.

BRIEF DESCRIPTION OF THE DRAWINGS

An exemplary embodiment of the invention is described in detail below on the basis of the appended drawing.

Shown are.

DETAILED DESCRIPTION OF THE DRAWINGS

Figure 1:
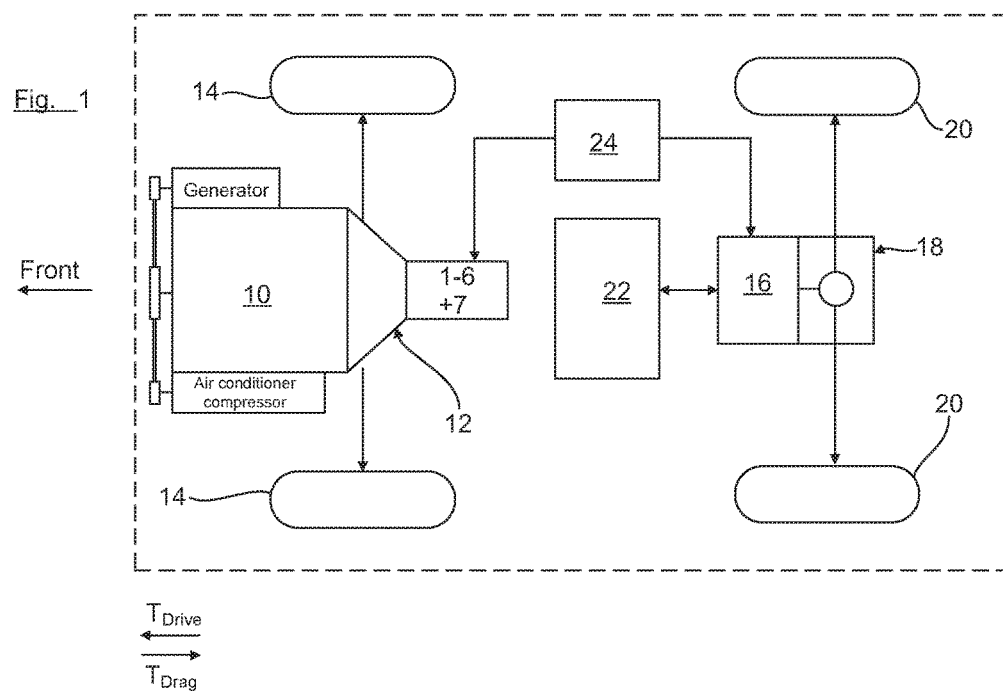
FIG. 1 as a flowchart, a hybrid drive system for motor vehicles with an internal combustion engine, a gearbox or transmission, and an electric motor as second drive source, which is controlled via an electronic control unit.

Shown in FIG. 1 is a largely schematic illustration of a drive device for a hybrid-driven motor vehicle, with an internal combustion engine 10, a gearbox 12 with an integrated differential (not illustrated), which outputs drive to the front wheels 14 of the motor vehicle.

The drive device further has, as a second drive source, an electric motor 16, which, via a differential 18 that is only roughly indicated, drives the rear wheels 20 of the motor vehicle.

The electric motor 16, which can be switched to operate as a motor or as a generator, is supplied with electric current via a traction battery 22 arranged in the motor vehicle, with the control of, among other things, the shifting operations in the gearbox 12 and the control of the electric motor 22 occurring via an electronic control unit 24, which, in a known way, evaluates both motor-specific (load requirement, rotational speed, etc.) data and travel-specific (speed, brake actuation, etc.) data.

Here, by way of example, the gearbox 12 is an automatic transmission (for example, a double-clutch transmission or an automatic transmission formed with planetary gear sets), which has six forward gears 1-6 (driving gears) and another gear ratio step, which makes available an overrun gear 7.

The driving gears 1-6 are designed, in terms of their ratios, as the starting gear 1, as the intermediate gears 2-5, and, if appropriate, as the overdrive gear 6, with the final speed of the motor vehicle being attained in the driving gear 5, while the overdrive gear 6 brings about a lowering of the rotational speed of the internal combustion engine in the higher range of speeds.

The overrun gear 7, by contrast, is designed in such a way that, in the higher range of speeds of the motor vehicle, the rotational speed of the internal combustion engine 10 in overrun mode is lowered essentially to idling rotational speed, wherein the idling rotational speed should lie preferably above a limit or threshold rotational speed, at which the supply of fuel to the internal combustion engine is resumed. In terms of its objective design, the overrun gear 7 can be a planetary gear set with appropriate gear ratios or a toothed gear set of the gearbox 12. However, all possible designs that lead to the diagram illustrated in FIG. 2 are conceivable.

Figure 2:
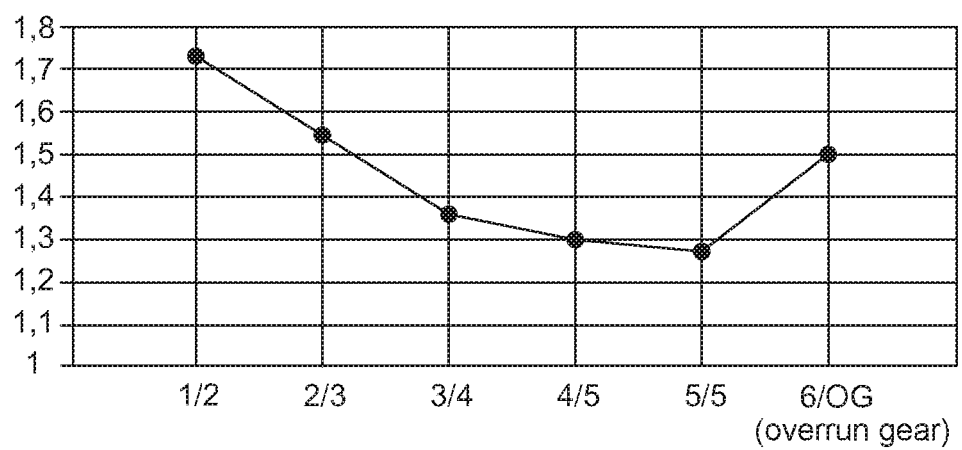
FIG. 2 an exemplary progressive ratio step diagram of the gear ratios of the gearbox according to FIG. 1 with a plurality of driving gears and an overrun gear.

FIG. 2 shows a diagram with the gear spacings of the gearbox 12. Usually, the progressive ratio step, which is defined as the quotient of a gear to the next-higher gear (for example, $\varphi_{1/2}=i1/i2$), is greater the lower the gears are and, at the higher gears, often gravitates toward a horizontal; however, the gear spacings can also be essentially linear (uniform). In designing the gear ratio steps in the gearbox 12, it is relevant that the progressive ratio steps produce a harmonic shift from one gear ratio step to another over the speed of the motor vehicle in a manner that is tuned to the performance curve of the internal combustion engine 10.

Figure 3:
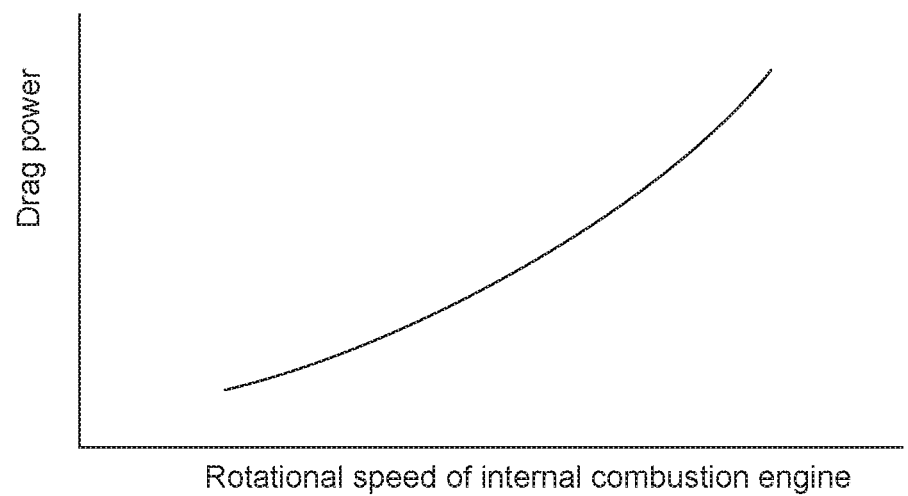
FIG. 3 a diagram that illustrates the dependence of the drag power (that is, the drag torque) on the rotational speed of the internal combustion engine.

As the diagram shows, the progressive ratio step of 6 (optionally) an overdrive gear) to the overrun gear 7 is markedly larger than the individual progressive ratio steps of the driving gears 1-6 and, by way of the appropriate gearbox ratio, ensures that, in overrun mode, the rotational speed of the internal combustion engine 10 is strongly lowered and can still exert only a small drag torque $T_{Drag}$, which counteracts a drive torque $T_{Drive}$ (FIG. 1). The dependence of the magnitude of the drag torque $T_{Drag}$ on the rotational speed of the internal combustion engine is depicted in the diagram of FIG. 3, according to which, with reduced rotational speed of the internal combustion engine, the drag torque also becomes smaller. Conversely, the result of this is that the overrun gear 7 does not form a driving gear serving for drive of the motor vehicle and, consequently, is activated in an automated manner only in overrun mode, but not in a traction mode of the vehicle, in which the vehicle is driven by the internal combustion engine.

In traveling operation of the motor vehicle, the internal combustion engine 10 and/or the electric motor 16 drive or drives the motor vehicle. If only the electric motor 16 drives the motor vehicle, then a gear up to the overrun gear can be engaged via the control unit 24, in which gear the internal combustion engine 10 is essentially set to idling rotational speed and in which gear no fuel injection occurs, but the auxiliary assemblies driven by the internal combustion engine 10 continue to function.

At a higher speed of the motor vehicle with the internal combustion engine 10 switched on, an overrun upshift of the gears occurs or the overrun gear 7 occurs in a recognized overrun mode, said upshift lowering the rotational speed of the internal combustion engine 10 essentially to idling rotational speed, as described.

In braking operation of the motor vehicle (detected via, among other things, a brake control unit or the actuation of a brake pedal), the electric motor 16 is additionally switched to operation as a generator and, in recuperation operation, supplies more or less electric current to the traction battery 22.

If, for example, a power demand is controlled once again via the gas pedal, then a driving gear in the gearbox 12, depending on the speed, is engaged, and the internal combustion engine 10 is correspondingly activated through a resumption of fuel supply.

The invention is not limited to the illustrated exemplary embodiment. Alternatively to this, it is also possible to provide two overrun gears, which, over a then broader range of speeds of the motor vehicle, ensures the rotational speed of the motor in the idling range.

If need be, it is possible via the control unit 24 to design the gear selection in such a way that the idling rotational speed of the internal combustion engine 10 constantly lies above a defined rotational speed threshold so as to prevent an undesired supply of fuel. In addition, this rotational speed threshold can also be reduced in a defined manner.

The described drive device as such is only exemplary. The electric motor 16 can also be positioned at another location in a known way (for example, on a Cardan shaft for a standard drive). However, it needs to be noted that, in overrun gear 7, only the rotational speed of the internal combustion engine 10, but not the rotational speed of the electric motor 16, is lowered.

The invention claimed is:

1. A drive device for a motor vehicle, comprising:
an internal combustion engine that outputs to a gearbox or transmission having a plurality of gear ratio steps, wherein in a traction mode driven by the internal combustion engine, shiftable driving gears are provided, wherein from a starting gear to a highest driving gear, the gearbox has at least one gear ratio step that provides an overrun gear that cannot be engaged in the traction mode, but only in an overrun mode in which the vehicle drags the internal combustion engine.

2. The drive device according to claim 1, wherein a magnitude of a drag torque ($T_{Drag}$) depends on a rotational speed of the internal combustion engine, wherein the smaller the rotational speed of the motor, the lower the drag torque ($T_{Drag}$), and wherein, for reduction of the drag torque ($T_{Drag}$), generated in the overrun mode, the overrun gear has a higher ratio than a highest driving gear that can be shifted in traction mode.

3. The drive device according to claim 2, wherein, in the overrun mode with an engaged overrun gear, the rotational speed of the internal combustion engine can be lowered by a motor control unit down to an idling speed of the internal combustion engine.

4. The drive device according to claim 2, wherein at least one or more than one gear ratio step that cannot be used as a driving gear, but can be used as the overrun gear, is shifted depending on a speed so the rotational speed of the internal combustion engine in the overrun mode can be lowered down to an idling rotational speed.

5. The drive device according to claim 1, wherein a quotient of the ratio (i) of a driving gear that can be shifted in the traction mode to the ratio (i) of a next-higher driving gear that can be shifted in the traction mode defines a progressive ratio step ($\varphi$), wherein the gearbox is configured such that the progressive ratio step ($\varphi$) becomes smaller, the higher the driving gears.

6. The drive device according to claim 5, wherein the progressive ratio step ($\varphi$) between the highest driving gear and the overrun gear is at least larger than a second progressive ratio step from the second-highest driving gear to the highest driving gear.

7. The drive device according to claim 1, wherein the motor vehicle is a hybrid-driven motor vehicle with an electric motor as a second drive source, wherein the overrun gear can be engaged at least when the motor vehicle is braked via the electric motor in a recuperation operation.

8. The drive device according to claim 7, wherein in the recuperation operation of the electric motor or in a braking operation of the motor vehicle, for at least one gear ratio step that is not provided as a driving gear, one or more transmission gear ratios are engaged such that, over a range of speeds, the rotational speed of the internal combustion engine is kept in an idling rotational speed range.

* * * * *